United States Patent [19]

Altenberg

[11] Patent Number: 4,735,110
[45] Date of Patent: Apr. 5, 1988

[54] SHIFTING ARRANGEMENT FOR TWO CLUTCHES FOR THE SHIFTING BETWEEN A SINGLE-AXLE STANDARD DRIVE AND A TWO-AXLE ALL-WHEEL DRIVE FOR A MOTOR VEHICLE HAVING TWO DRIVABLE VEHICLE AXLES

[75] Inventor: Friedrich Altenberg, Heilbronn, Fed. Rep. of Germany

[73] Assignee: Daimler-Benz Aktiengesellschaft, Stuttgart, Fed. Rep. of Germany

[21] Appl. No.: 3,389

[22] Filed: Jan. 15, 1987

[30] Foreign Application Priority Data

Jan. 15, 1986 [DE] Fed. Rep. of Germany ....... 3600870

[51] Int. Cl.$^4$ ............................................. F16H 3/74
[52] U.S. Cl. ................................ 74/752 A; 192/87.19; 180/247; 180/248; 180/249
[58] Field of Search ............. 74/751, 752 A; 180/247, 180/248, 249, 250, 233, 197; 192/87.14, 87.15, 87.16, 87.17, 87.18, 87.19

[56] References Cited

U.S. PATENT DOCUMENTS

| 3,527,328 | 9/1970 | Maurice | 192/87.19 X |
|---|---|---|---|
| 3,963,085 | 6/1976 | Vinton | 180/250 X |
| 4,466,502 | 8/1984 | Sakai | 180/248 X |
| 4,538,700 | 9/1985 | Suzuki | 180/250 X |
| 4,586,583 | 5/1986 | Yamakawa et al. | 180/247 |
| 4,602,696 | 7/1986 | Taga et al. | 180/247 |
| 4,611,698 | 9/1986 | Lehmann | 192/87.14 X |
| 4,637,504 | 1/1987 | Rule et al. | 192/87.19 X |

FOREIGN PATENT DOCUMENTS

| 3203707 | 8/1983 | Fed. Rep. of Germany . | |
| 2104178 | 3/1983 | United Kingdom | 180/247 |
| 2172863 | 10/1986 | United Kingdom | 180/249 |

*Primary Examiner*—Dirk Wright
*Attorney, Agent, or Firm*—Barnes & Thornburg

[57] ABSTRACT

A shifting arrangement for the shifting between a single-axle standard drive and an all-wheel drive, having a first clutch for the locking of a central differential gear and a second clutch for the connecting and disconnecting of one vehicle axle, actuated by first and second pressure medium control elements against the force of a spring and having a shift valve controlled by an electronic control unit, to either supply working pressure or relieve from pressure the control element. The shift valve can be controlled by the control unit in such a way that, when there is a shifting into the shifting step for the standard drive, the clutch torque of the clutch of the differential gear at least approximately increases only to the extent to which the clutch torque of the other clutch decreases. As a result, a sudden rise of torque is avoided at the vehicle axle that is driven in a standard drive.

8 Claims, 2 Drawing Sheets

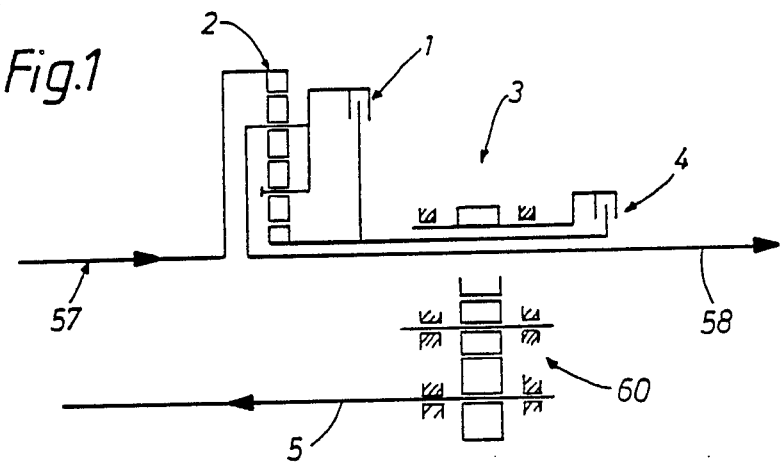
Fig.1
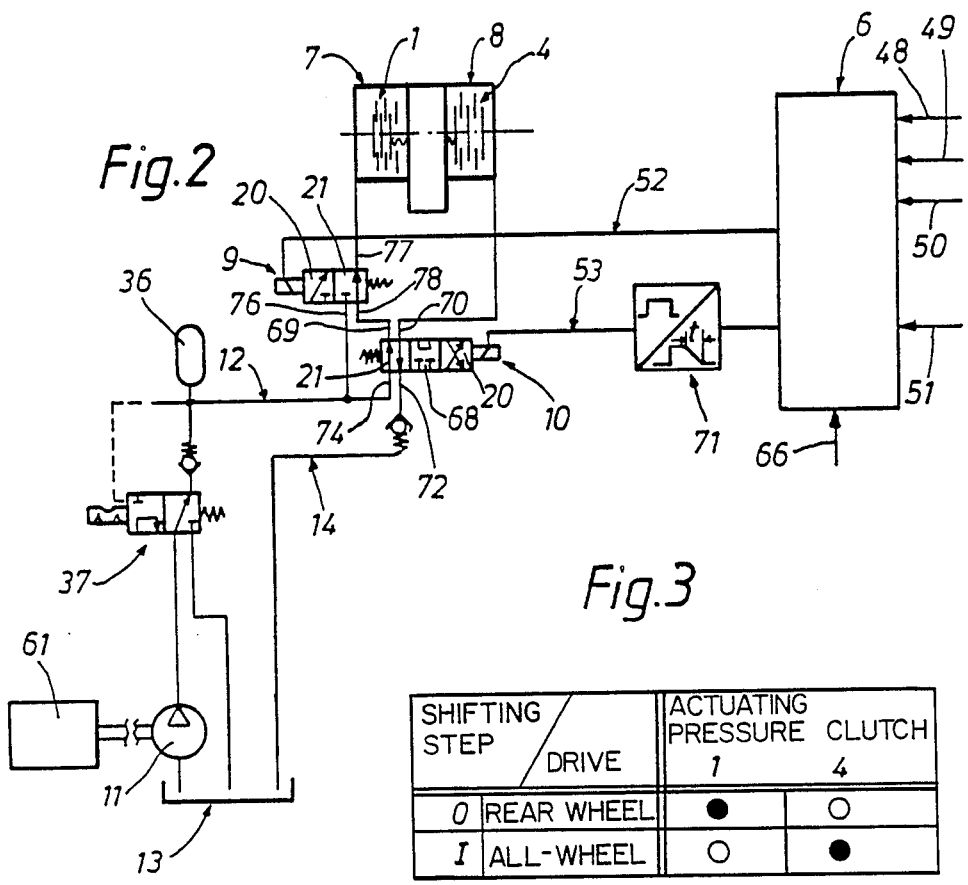
Fig.2
Fig.3
| SHIFTING STEP | DRIVE | ACTUATING PRESSURE | CLUTCH |
|---|---|---|---|
| | | 1 | 4 |
| 0 | REAR WHEEL | ● | ○ |
| I | ALL-WHEEL | ○ | ● |

SHIFTING ARRANGEMENT FOR TWO CLUTCHES FOR THE SHIFTING BETWEEN A SINGLE-AXLE STANDARD DRIVE AND A TWO-AXLE ALL-WHEEL DRIVE FOR A MOTOR VEHICLE HAVING TWO DRIVABLE VEHICLE AXLES

BACKGROUND AND SUMMARY OF THE INVENTION

The invention relates to a shifting arrangement for two clutches for the shifting between a single-axle standard drive and a two-axle all-wheel drive for a motor vehicle having two drivable vehicle axles.

A known shifting arrangement of this type (DE-OS No. 32 03 707), for a drive that is a permanent all-wheel drive per se, uses a fast-shifting clutch for the front axle in order to improve the driving characteristics in special operating situations. The shifting from the all-wheel drive to the rear wheel drive may take place automatically as a function of the steering angle, or manually via a switch.

The objective of the invention is to carry out, in the case of a shifting arrangement of the initially mentioned type, the shifting into the shift step for standard drive as fast as possible but mainly as smoothly as possible and without any sudden torque increase at the rear axle.

In the case of the shifting arrangement according to the invention, smooth and fast shifts are made possible because of the use of frictionally engaged clutches and pressure-medium-operated control elements. For shifting into the shifting step for the standard drive, a shift valve can be controlled by the control unit in such a way that, the clutch torque of the clutch of the differential gear increases at least approximately only to the extent to which the clutch torque of the clutch for one vehicle axle decreases.

The shift valve has an intermediate position in which the valve connection that is connected with the second control element of a second clutch of one vehicle axle is connected with the valve connection that is part of the switching step for the standard drive. An electronic function converter is connected between the shifting valve and the control unit for controlling the shift valve to pass through the intermediate position when shifting slowly through the intermediate position when the shifting signal for the shifting step for standard drive occurs and to pass rapidly through the intermediate position when the shifting signal for the shifting signal for a balanced all-wheel drive occurs.

In a first embodiment the two clutches are disengaged by spring force and engaged by auxiliary forces through their control elements. The valve connection that is connected with the first control element of the first clutch is connected with the valve connection that is connected with the second control element of the second clutch in the intermediate position.

In a second embodiment the first clutch is engaged by auxiliary force at its first control element and the second clutch is engaged by spring force. The valve connection of the shift valve that is connected with the first control element of the first clutch is continuously connected with the second control element of the second clutch and, in the intermediate position is connected with the valve connection for the storage tank. The intermediate position of the proportional valve in the second embodiment includes a throttle connection between the valve connection that is connected with the control elements and the pressure source.

In a third embodiment, the first clutch is engaged by spring force and the second clutch is engaged by the auxiliary force at the second element. The valve connection of the shift valve that is connected with the first control element of the first clutch is contacted continuously with the control element of the second clutch and in the intermediate position is connected with the valve connection of the shift valve for the pressure source. In the third embodiment the intermediate position includes a throttle connection between the valve connection connected with the control elements of the clutches and the valve connection for the storage tank.

Other objects, advantages and novel features of the present invention will become apparent from the following detailed description of the invention when considered in conjunction with the accompanying drawings.

BRIEF DESCRIPTION OF THE DRAWINGS

FIG. 1 is a gear diagram for the drive of two driving axles of a motor vehicle having two frictionally engageable clutches for the shifting between two shifting steps for a standard drive and for a balanced all-wheel drive;

FIG. 2 is a shifting arrangement according to the invention in a first embodiment for the shifting of the two clutches in the diagram of FIG. 1;

FIG. 3 is a shifting table concerning the operation of the two clutches in the two shifting steps shifted by means of the shifting arrangement of FIG. 2;

DETAILED DESCRIPTION OF THE DRAWINGS

Figure 4:
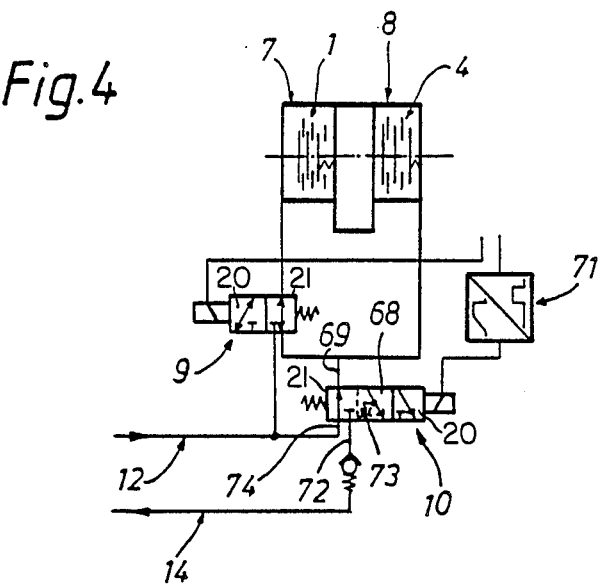
FIG. 4 is a variant of the shifting arrangement of FIG. 2 as a embodiment.

With reference to the transfer transmission 3 of FIG. 1, a multi-disk clutch 1 is connected with a planetary carrier of a planetary-wheel differential gear 2 carrying mating double-planets and with an inner central wheel that is connected with an output shaft 58 and mates with the innerplanets. The outer central wheel of the differential gear 2 is connected with an input shaft 57 which may be a gear output shaft of a gear change box that is connected behind a driving engine 61 (see FIG. 2) in the power train of the motor vehicle. The output shaft 58, in the conventional way, via a drive train, is in driving connection with the axle drive of the rear axle.

The inner central wheel of the differential gear 2 can be coupled with the input wheel of a spur wheel gear 60 by a multi-disk clutch 4. The output wheel of spur wheel gear 66 is connected torsionally fixed with a power take-off shaft 5 that leads to the axle drive of the front axle of the motor vehicle.

By the locking of the differential gear 2 with the clutch 1, the output shaft 58 is driven directly by the input shaft 57. In which case, the rear axle alone is driven in standard drive when the clutch 4 is disengaged or the rear axle together with the front axle is driven in a non-balanced all-wheel drive when the clutch 4 is engaged.

In a further third shifting step, the clutch 4 alone is engaged so that both vehicle axles can be driven in a balanced all-wheel drive via the now operative central differential gear 2.

With reference to the block diagram of FIG. 2, the two clutches 1 and 4 are actuated by individual pressure-medium control element 7 and 8 of an axial-piston design respectively that are shown in outline only. The control elements 7 and 8 can be connected with a pressure reservoir line 12 or with a return line 14 by shift valve 9 and 10 respectively. A pressure reservoir line 12 is connected with a pressure reservoir 36. A charge valve 37, controlled by the storage pressure, charges the pressure reservoir 36 by a pressure-medium pump 11 driven by the driving engine 61.

The return line 14 leads to an essentially pressure-relieved pressure-medium storage tank 13, via a check valve, and a valve connection 72 of the shift proportional valve 10 that operates as an electromagnetic proportional valve. The shift valve 10 passes through an intermediate position 68 when it is shifted between a shifting position 20 actuated by the solenoid and a currentless rest position 21 shifted by the force of a spring. In the intermediate position 68, a valve connection 69 of the proportional valve 10 that is connected with the control element 7 via the other shift valve 9, and a valve connection 70, that is connected with the control element 8, are connected with one another at the proportional valve 10.

In the rest position 21 of the proportional valve 10, its valve connection 70 and 72 are connected with one another, and its valve connection 69 and an additional valve connection 74 connected to the feeding pressure line 12 are connected with one another at the proportional valve 10.

In the shifting position 20 of the proportional valve 10, the valve connections 69 and 72 are connected with one another at the proportional valve 10, on the one side, and the valve connections 70 and 74 are connected with one another on the other side.

The solenoid of the proportional valve 10 is connected with an electronic control unit 6 via a control line 53 and an electronic function converter 71. The function converter 71 operates in such a way that the proportional valve 10, in the case of a shifting into shifting position 20, passes through its intermediate position 68 rapidly, but in the case of a shifting into shifting position 21, passes through it slowly. This corresponds to the top and bottom waveforms respectively shown in function coverter 71.

The control unit 6 operates as a function of two rotational speed signals 48 and 49 of the wheels of the front axle, of a rotational speed signal 50 that is the arithmetical mean of the rotational speeds of the wheels of the rear axle, of a signal 51 representing the steering angle of the steering wheel and of a braking signal 66 that is triggered by the actuating of the vehicle brakes, according to the German Patent Application No. P 35 05 455.

The control unit 6 provides an output signal, via an additional control line 52, to the solenoid of the shifting valve 9 that includes valve connections 76, 77 and 78. The shift valve 9 can be brought into a shifting position 20 in which the valve connection 76, connected to the feeding pressure line 12, is connected with the valve connection 77 connected to the control element 7, while the valve connection 78 that is connectes with the valve connection 69 of the proportional valve 10 is blocked.

In contrast, in a rest position 21 of the shift valve 9 shifted by means of the force of a spring, the valve connections 77 and 78 are connected with one another and the valve connection 76 is blocked.

Under certain slip conditions, the control unit 6 brings the shifting arrangement into the shifting step for a balanced all-wheel drive in which clutch 1 must be disengaged, but clutch 4 must be engaged.

In the case of the embodiment of FIG. 2, the clutches 1 and 4 are engaged by the control elements 7 and 8 respectively, and are disengaged by the force of a spring. Consequently, in the shifting step for a balanced all-wheel drive, the shift valve 10 is brought into shifting position 20, and shift valve 9 is brought into rest position 21, whereby the control element 8 is connected to the feeding pressure line 12 and the control element 7 is connected to the return line 14.

In the case of a shifting into the shifting step standard drive, in which only the clutch 1 is engaged, the shift valve 9 remains currentless in its rest position 21, whereby the control element 7 of the clutch 1 to be engaged continues to remain connected to the valve connection 69 of the proportional valve 10. The proportional valve 10, in this case, moves slowly from its shifting position 20 through its intermediate position 68 in which now both control members 7 and 8 are connected with one another so that the pressure in the control elements equalize. As a result, the torque of both clutches 1 and 4 are coupled with one another. Thus, the torque increase at the clutch 1 for the rear axle drive cannot take place suddenly.

FIG. 3 is a table summarizing the state of the first embodiment for rear wheel drive or standard drive and balanced all-wheel drive.

In the case of a second embodiment according to FIG. 4, the clutch 1 is engaged by the control element 7 and disengaged by spring force, and the clutch 4 is engaged by the force of a spring and disengaged by control element 8. In the second embodiment, the proportional valve 10, on the output side, is equipped with only one valve connection 69 that is connected with both control elements 7 and 8. The valve connection 69, in the rest position 21, is connected with the valve connection 74 of the feeding pressure line 12. As a further adaption, in the rest position 21, the valve connection 72 of the proportional valve 10 for the return line 14 is blocked. Finally, in the shift position 20 of the proportional valve 10, its valve connections 69 and 72 are connected with one another and the valve connection 74 is blocked. Since this arrangement admits pressure to both clutches 1 and 4 in the currentless condition of the shift valves 9 and 10, i.e., in standard drive, the clutch 1 is engaged and the other clutch 4 is disengaged.

In the shifting step for a balanced all-wheel drive, only the proportional valve 10 is moved into its shifting position 20, whereby both control elements 7 and 8 are shifted to the return line and only clutch 4 is engaged—by the force of a spring.

In the case of a shifting into standard drive from the balanced all-wheel drive, the proportional valve 10 slowly passes from position 20 through its intermediate position 68 in which, in the case of this embodiment, the two valve connections 69 and 72 are open with respect to one another and have a throttled connection 73 with the valve connection 74 in the direction of its rest position 21. Thus, the torque buildup in the clutch 1 takes place to the extent to which the torque falls in the clutch 4.

Figure 5:
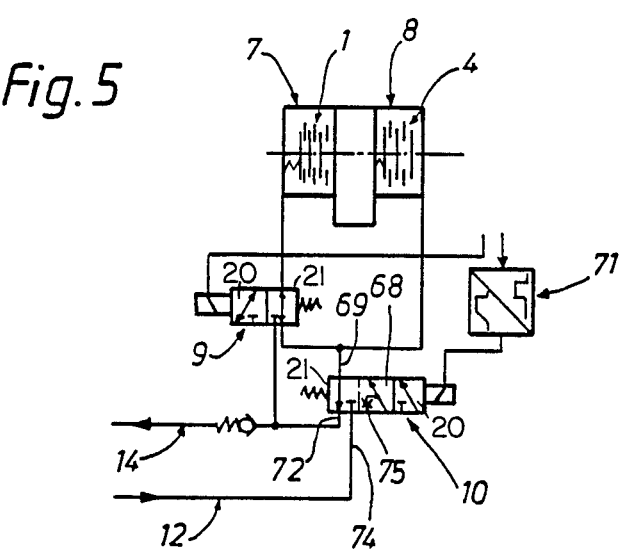
FIG. 5 is another variant of the shifting arrangement of FIG. 2 as a third embodiment of the invention.

In a third embodiment of FIG. 5, the clutch 1 is engaged by the force of a spring and disengaged by control element 7, and the clutch 4 is engaged by its control element 8 and disengaged by the force of a spring.

As an adaptation to this different type of clutch operation, the valve connections 72 and 74 of the proportional valve 10, that in the two positions 20 and 21 are each connected to the valve connection 69, are with respect to the embodiment according to FIG. 4 exchanged with one another. Namely, the valve connection 69, in the shifting position 20, is connected with the valve connection 74 and in the rest position 21, it is connected with the valve connection 72. In the intermediate position 68, a throttled connection 75 is in effect between the valve connection 72 of the return line 14, on the one side, and the two valve connections 69 and 74, on the other side.

In the case of a shifting into the shifting step standard drive, the proportional valve 10 again passes slowly through its intermediate position 68, so that both clutches 1 and 4, while being throttled via the valve passage 75, are slowly switched off the pressure reservoir 36 and are successively connected with the return line 14.

In this way, it is also ensured in the case of this type of clutch operation that the clutch torque in clutch 1 for the standard drive, cannot rise suddenly but only gradually.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A shifting arrangement for a system having a first clutch operating with a frictional engagement for the locking of a central planetary wheel differential gear of a transfer transmission for the drive of two vehicle axles of a motor vehicle and a second clutch operating with a frictional engagement for the driving connection between the transfer transmission and one vehicle axle, the shifting arrangement includes a first and second independent control element for said first and second clutch respectively, independent operated by a hydraulic pressure-medium auxiliary force and, connected either with a pressure source or with an essentially pressure-relieved storage tank by a shift valve controlled by a control unit, for the actuating of the clutches between a shift step for a single-axle standard drive—in which the first clutch is engaged and the second clutch is disengaged—and a shift step for a balanced all-wheel drive—in which the first clutch is disengaged and the second clutch is engaged, said control unit controlling said shift valve in such a way that, in the case of a shifting into the shifting step for the standard drive, the clutch torque of the first clutch of the differential gear increases at least approximately only to the extent to which the clutch torque of the second clutch for one vehicle axle decreases.

2. A shifting arrangement according to claim 1, wherein said shift valve is an electromagnetic proportional valve and includes an intermediate position, in which its valve connection that is connected with the second control element of the second clutch is connected with a valve connection (69 and 72) that is not part of the switching step for the standard drive.

3. A shifting arrangement according to claim 2, including an electronic function converter means connecting said proportional valve with the control unit for controlling the proportional valve to pass slowly through the intermediate position when the shifting signal for the shifting step for a standard drive occurs, and to pass rapidly through the intermediate position, when the shifting signal for the shifting step for a balanced all-wheel drive occurs.

4. A shifting arrangement according to claim 2, wherein the two clutches are each disengaged by the force of a spring and engaged by the auxiliary force of their control element and in that the valve connection of the proportional valve that is connected with the first control element for the first clutch is connected with the valve connection that is connected with the second control element of the second clutch in the intermediate position.

5. A shifting arrangement according to claim 2, wherein the first clutch is engaged by the auxiliary force of the first control element and the second clutch is engaged by the force of a spring, and the valve connection of the proportional valve that is connected with the first control element for the first clutch is continuously connected with the second control element of the second clutch and in the intermediate position, is connected with the valve connection of the proportional valve for the storage tank.

6. A shifting arrangement according to claim 5, wherein the intermediate position of the proportional valve, includes a throttled additional connection between the valve connection that is connected with the control elements of the clutches and the valve connection for the pressure source.

7. A shifting arrangement according to claim 2, wherein the first clutch is engaged by the force of a spring, and the second clutch is engaged by the auxiliary force of the second control element, and the valve connection of the proportional valve that is connected with the first control element for the first clutch is connected continuously with the second control element of the second clutch and in the intermediate position, with the valve connection of the proportional valve for the pressure source.

8. A shifting arrangement according to claim 7, wherein the intermediate position of the proportional valve includes a throttled additional connection between the valve connection connected with the control elements of the clutches and the valve connection for the storage tank.

* * * * *